United States Patent [19]

Ritsema

[11] 4,387,791

[45] Jun. 14, 1983

[54] PARKING BRAKE FOR FRONT WHEEL DRIVE VEHICLE INCLUDING BRAKE BAND FOR UNIVERSAL JOINT

[75] Inventor: Irving R. Ritsema, South Bend, Ind.

[73] Assignee: The Bendix Corporation, Southfield, Mich.

[21] Appl. No.: 239,298

[22] Filed: Mar. 2, 1981

[51] Int. Cl.³ ............................................. F16D 51/00
[52] U.S. Cl. ............................... 188/77 R; 192/4 A; 303/13; 188/106 F
[58] Field of Search ..................... 188/77 W, 77 R, 75, 188/76, 16, 106 F, 106 P, 259, 249, 2 D, 17, 354, 26, 58; 180/297; 192/4 A, 80; 303/13, 6 R, 6 A

[56] References Cited

U.S. PATENT DOCUMENTS

| 1,204,375 | 11/1916 | Neal | 192/4 A |
|---|---|---|---|
| 1,230,896 | 6/1917 | Haupt | 192/4 A |
| 2,014,903 | 9/1935 | Logan, Jr. | 188/77 R |
| 2,475,679 | 7/1949 | Sinclair | 192/4 A X |
| 3,042,155 | 7/1962 | Kelley | 188/106 F X |
| 3,116,817 | 1/1964 | Quick et al. | 192/4 |
| 3,302,740 | 2/1967 | Giccosa | 180/297 X |
| 3,516,519 | 6/1970 | Besoyan | 188/77 R |
| 3,517,572 | 6/1970 | Schmid | 188/77 R X |

FOREIGN PATENT DOCUMENTS 639240 5/1962 Italy .

Primary Examiner—Douglas C. Butler
Attorney, Agent, or Firm—Paul David Schoenle; Ken C. Decker

[57] ABSTRACT

A brake system for a vehicle having front wheel drive includes a parking brake assembly (58, 60) comprising a band brake which is engageable with an existing universal joint (62, 64). The parking brake is independent from a pair of front brake assemblies 30 and a pair of rear brake assemblies 34. Each band brake is independently operated via cables (44, 46) so that failure of one band or cable does not affect the parking brake operation for the other band or cable.

4 Claims, 1 Drawing Figure

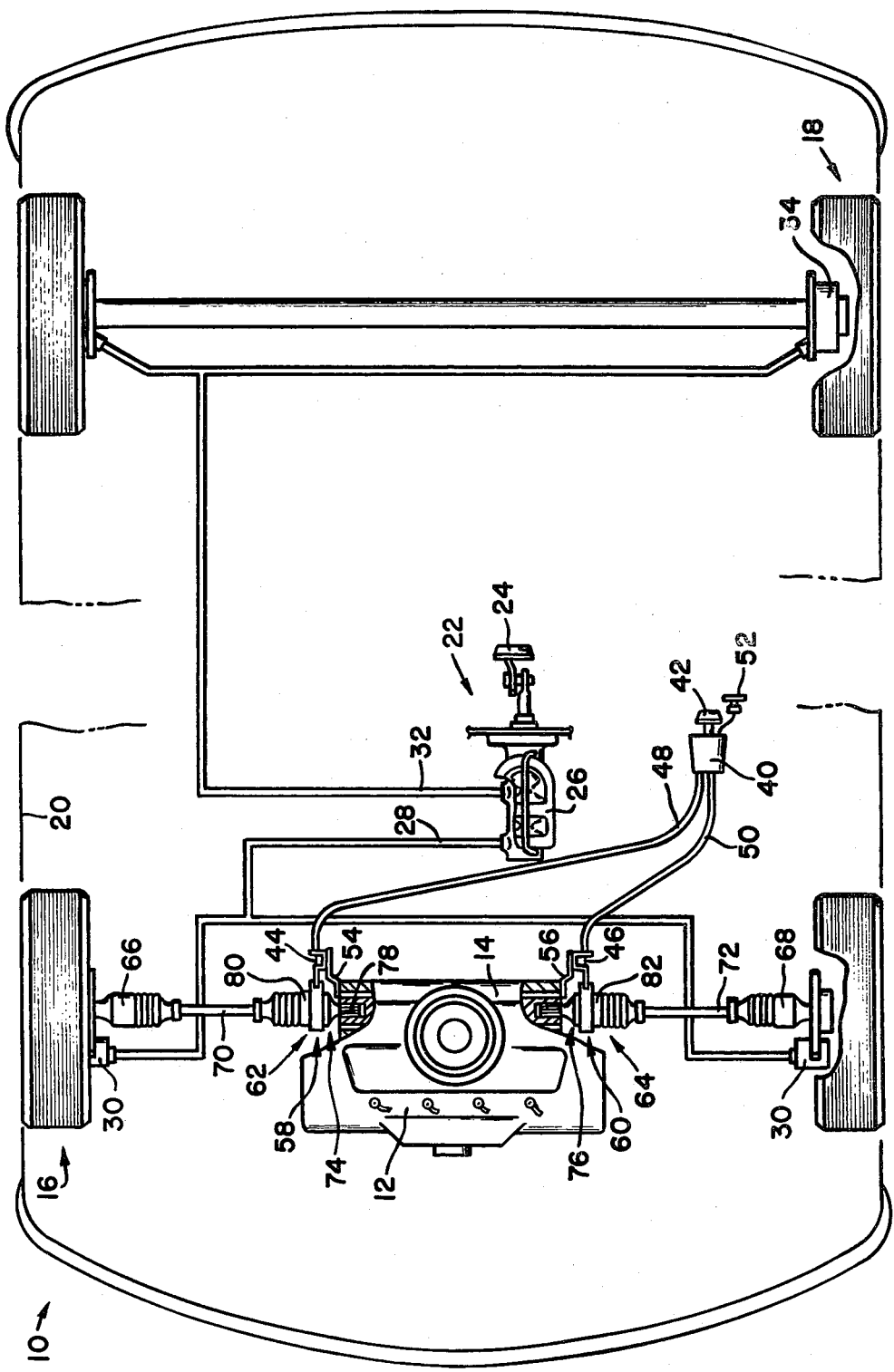

PARKING BRAKE FOR FRONT WHEEL DRIVE VEHICLE INCLUDING BRAKE BAND FOR UNIVERSAL JOINT

This invention relates to a brake system for a front wheel drive vehicle and, in particular, a parking brake assembly for such vehicles.

Most front wheel drive vehicles are provided with front disc brakes and rear drum brakes. For parking, the rear drum brakes are provided with levers to mechanically actuate the brake shoes of the rear drum brakes during a parking brake application. In the alternative, other front wheel drive vehicles incorporate the parking brake into the front disc brakes.

When the parking brake is provided in the rear drum brake the size of the drum brake must be large enough to substantially prevent movement of the vehicle on an inclined surface during parking. However, when the size is sufficiently large to prevent movement of the vehicle, the drum brake is too efficient for service braking as the drum brake will lock up in the absence of a proportioning valve to decrease braking pressure to the rear brakes during a service brake application. As for disc brake parking, the clamping force needed to sufficiently engage a pair of friction pads with a rotor requires a large torque wrench and nut design. The disc brake parking design also requires substantial modification of the disc brake which adversely affects the economics for disc brake parking.

The present invention provides a solution to the problem of providing a simple and economic parking brake assembly for front wheel drive vehicles. In particular, the present invention provides in a brake system for a front wheel drive vehicle having an engine coupled to a transmission which imparts movement to a pair of front wheels via universal joints, a first pair of brake assemblies cooperating with the pair of front wheels during a service brake application to stop the vehicle, a second pair of brake assemblies cooperating with a pair of rear wheels during a service brake application to also stop the vehicle, and a parking brake assembly operable during a parking brake application to substantially prevent movement of the vehicle, characterized by said parking brake assembly comprising at least one band which is contracted during the parking brake application to frictionally engage an outer surface on one of said universal joints.

The advantage of the invention is that a parking brake is provided by using an already existing universal joint in combination with at least one band so that the integrity of the front and rear brakes is retained. Another advantage is that a pair of bands cooperate independently with a pair of universal joints so that if one band is rendered inoperative, the other band will provide a parking brake application.

The sole FIGURE schematically illustrates a brake system for a vehicle according to the present invention.

Turning to the FIGURE, a front wheel drive vehicle 10 includes an engine 12 coupled to a transmission 14 to impart movement to the vehicle via a pair of front wheels 16. A pair of rear wheels 18 are coupled to the vehicle body 20 to merely support the body 20. A brake system 22 defines a brake pedal 24 coupled to a master cylinder 26 to develop fluid pressure therein. A first fluid path 28 communicates the master cylinder 26 with a pair of front wheel disc brake assemblies 30 and a second fluid path 32 communicates the master cylinder 26 with a pair of rear drum brake assemblies 34.

In accordance with the invention, a bracket 40 pivotally supports a parking brake pedal 42 which is connected to independent cables 44 and 46. The cables 44 and 46 are movably enclosed within conduits 48 and 50, respectively. A release handle 52 is carried by the bracket 40 to release the parking brake pedal after it is locked in an applied position. Mounting plates 54 and 56 are secured to the transmission 14 to carry the conduits 48 and 50. Each cable 44 and 46 is connected to a band brake assembly 58 and 60 which, in turn, are respectively positioned adjacent the transmission on opposite sides thereof to surround universal joints 62 and 64. The universal joints 62 and 64 are commonly referred to as inboard universal joints, whereas, outer universal joints 66 and 68 connect the drive shafts 70 and 72, respectively, with the front wheels 16. Each inboard universal joint includes a socket 74 and 76 having reduced diameter splined ends 78 disposed within the transmission housing. The sockets 74 and 76 extend outwardly from the transmission housing to form enlarged diameter portions 80 and 82; and it is these enlarged diameter portions 80 and 82 which form outer surfaces engageable with the band brake assemblies 58 and 60.

During a parking brake application, the pedal 42 is pivoted to pull the cables 44 and 46 within their respective conduits 48 and 50. Movement of the cables relative to the mounting plates 54 and 56 causes the band brake assemblies 58 and 60 to contract radially into tight engagement with the outer surfaces of sockets 74 and 76. Consequently, rotation of either drive shaft 70 or 72 is substantially prevented to immobilize the vehicle.

If either cable 44 or 46 is rendered inoperative, or if either band brake 58 or 60 is rendered inoperative, the other cable or band brake will be operable upon actuation of pedal 42 to substantially immobilize the vehicle.

The operation of either band brake 58 or 60 is independent of the front disc brakes 30 and also independent of the rear drum brakes 34. In addition, the front disc and rear drum brakes are remotely disposed from the parking brake assembly so that operation of the disc and drum brakes requires no cooperation with the parking brake assembly.

By providing a band brake assembly which cooperates with the universal joints to develop a parking brake, it is possible to design the front disc brake and the rear drum brake without compromise for a parking brake assembly. Also, by providing a band brake which cooperates with universal joints, only the band brake is added because the universal joint is already a required part for a front wheel drive vehicle.

Although the foregoing specification refers to a front disc brake and a rear drum brake, the invention is equally applicable to four wheel drum brake or four wheel disc brake vehicles.

I claim:

1. In a brake system for a front wheel drive vehicle having an engine coupled to a transmission which imparts movement to a pair of front wheels via universal joints, a first pair of brake assemblies cooperting with the pair of front wheels during a service brake application to stop the vehicle, a second pair of brake assemblies cooperating with a pair of rear wheels during a service brake application to also stop the vehicle, and a parking brake assembly operable during a parking brake application to substantially prevent movement of the vehicle, characterized by said parking brake assembly comprising a pair of bands which are contracted during the parking brake application to frictionally engage a pair of said universal joints.

2. The brake system of claim 1 characterized by said pair of universal joints being integrally formed by a pair of sockets, each of said pair of sockets having one end extending into said transmission and other end defining an enlarged diamater portion engageable with a respective band.

3. A brake system for a vehicle comprising, in combination, a pair of rear brakes cooperating with rear wheel assemblies to stop the vehicle during a brake application, a pair of front brakes cooperating with front wheel assemblies to also stop the vehicle during the brake application, a pair of drive shafts transmitting movement from a transmission for the vehicle to the front wheels, a pair of universal joints disposed between the pair of drive shafts and the transmission and a parking brake cooperating with the pair of universal joints to substantially prevent movement of the vehicle during a parking brake application, the parking brake including a pair of bands engageable with an outer surface of the respective universal joints.8

4. The brake system of claim 3 in which the vehicle includes a parking brake pedal which is movable during the parking brake application and independent actuating links extend from the parking brake pedal to respective bands so that each band is engageable with its respective universal joints independently of the other band.

* * * * *